United States Patent
Putman et al.

(10) Patent No.: US 11,747,772 B1
(45) Date of Patent: Sep. 5, 2023

(54) THRESHOLD DETERMINATION FOR PREDICTIVE PROCESS CONTROL OF FACTORY PROCESSES, EQUIPMENT AND AUTOMATED SYSTEMS

(71) Applicant: Nanotronics Imaging, Inc., Cuyahoga Falls, OH (US)

(72) Inventors: John B. Putman, Celebration, FL (US); Sarah Constantin, Brooklyn, NY (US); Valerie Bordelanne, New York, NY (US); Damas Limoge, Brooklyn, NY (US); Jonathan Lee, Brooklyn, NY (US)

(73) Assignee: Nanotronics Imaging, Inc., Cuyahoga Falls, OH (US)

( * ) Notice: Subject to any disclaimer, the term of this patent is extended or adjusted under 35 U.S.C. 154(b) by 0 days.

(21) Appl. No.: 17/931,442

(22) Filed: Sep. 12, 2022

(51) Int. Cl.
G05B 13/02 (2006.01)
G05B 13/04 (2006.01)

(52) U.S. Cl.
CPC ....... *G05B 13/0265* (2013.01); *G05B 13/042* (2013.01)

(58) Field of Classification Search
CPC ............ G05B 13/0265; G05B 13/041
See application file for complete search history.

(56) References Cited

U.S. PATENT DOCUMENTS

| | | | |
|---|---|---|---|
| 2011/0106328 A1* | 5/2011 | Zhou | G05B 13/024 700/291 |
| 2018/0162652 A1* | 6/2018 | Rolfes | G05B 19/4189 |
| 2020/0401120 A1* | 12/2020 | Putman | G05B 19/41875 |
| 2021/0103654 A1* | 4/2021 | Putman | G06F 21/554 |

\* cited by examiner

*Primary Examiner* — Mark A Connolly
(74) *Attorney, Agent, or Firm* — DLA PIPER LLP (US)

(57) ABSTRACT

A deep learning process receives desired process values associated with the one or more process stations. The deep learning processor receives desired target values for one or more key performance indicators of the manufacturing process. The deep learning processor simulates the manufacturing process to generate expected process values and expected target values for the one or more key performance indicators to optimize the one or more key performance indicators. The simulating includes generating a proposed state change of at least one processing parameter of the initial set of processing parameters. The deep learning processor determines that expected process values and the expected target values are within an acceptable limit of the desired process values and the desired target values. Based on the determining, the deep learning processes causes a change to the initial set of processing parameters based on the proposed state change.

7 Claims, 9 Drawing Sheets

THRESHOLD DETERMINATION FOR PREDICTIVE PROCESS CONTROL OF FACTORY PROCESSES, EQUIPMENT AND AUTOMATED SYSTEMS

FIELD OF DISCLOSURE

The present disclosure generally relates to systems, apparatuses and methods for predictive process control of factory processes, equipment, and automated systems.

BACKGROUND

To manufacture products that consistently meet desired design specifications, safely, timely and with minimum waste, requires constant monitoring and adjustments to the manufacturing process.

SUMMARY

In some embodiments, a manufacturing system is disclosed herein. The manufacturing system includes one or more process stations, a station control system, and a controller. The one or more process stations are configured to execute a manufacturing process. The manufacturing process includes an initial set of processing parameters. The station control system is configured to control the one or more process stations. The controller is in communication with the one or more process stations and the station control system. The controller is configured to perform operations. The operations include receiving desired process values associated with the one or more process stations. The operations further include receiving desired target values for one or more key performance indicators of the manufacturing process. The operations further include simulating, by a deep learning processor, the manufacturing process to generate expected process values and expected target values for the one or more key performance indicators to optimize the one or more key performance indicators. The simulating includes generating a proposed state change of at least one processing parameter of the initial set of processing parameters. The operations further include determining, by the deep learning processor, that expected process values and the expected target values are within an acceptable limit of the desired process values and the desired target values. The operations further include, based on the determining, causing a change to the initial set of processing parameters based on the proposed state change.

In some embodiments, a computer-implemented method is disclosed herein. A computing system receives desired process values associated with one or more process stations, the one or more process stations configured to execute a manufacturing process. The manufacturing process includes an initial set of processing parameters. The computing system receives desired target values for one or more key performance indicators of the manufacturing process. A deep learning processor of the computing system simulates the manufacturing process to generate expected process values and expected target values for the one or more key performance indicators to optimize the one or more key performance indicators. The simulating includes generating a proposed state change of at least one processing parameter of the initial set of processing parameters. The deep learning processor of the computing system determines that expected process values and the expected target values are within an acceptable limit of the desired process values and the desired target values. Based on the determining, the computing system causes a change to the initial set of processing parameters based on the proposed state change.

In some embodiments, a computer-implemented method is disclosed herein. A computing system receives actual output values corresponding to a manufacturing process of a manufacturing system. The receiving includes receiving stable data corresponding to normal production data during a normal production phase of the manufacturing process and receiving unstable data corresponding to abnormal production data outside of the normal production phase of the manufacturing process. The computing system generates a training data set comprising the stable data and the unstable data. The computing system trains a machine learning model to generate expected process values and expected target values for one or more key performance indicators. The computing system determines that the machine learning model has achieved a threshold level of accuracy. Responsive to the determining, the computing system deploys the machine learning model in the manufacturing system.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

Figure 1:
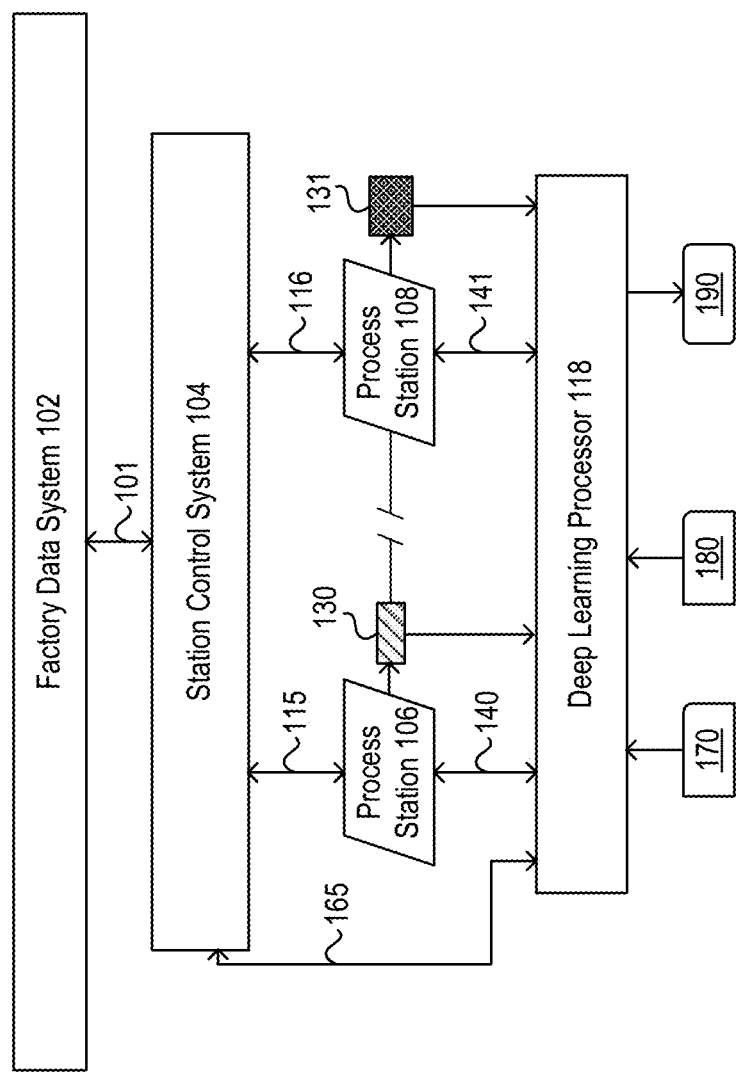
FIG. 1 illustrates an example manufacturing environment, according to example embodiments.

Manufacturing in a manufacturing environment (e.g., a factory) can include various processes to control manufacturing components (e.g., machines, control systems) in the environment. In particular, components enabling manufacturing in a factory can be complex and can include various process stations (or "stations") that process raw components to produce a final output product. Various process stations can receive an input for processing and output an intermediate output that is passed along to one or more subsequent (downstream) processing stations for additional processing. The final process station can obtain an input for processing and can output the final output.

Each process station can include one or more tools/equipment that are configured to perform a set of process steps on the raw materials or any intermediate output obtained from another processing station. Examples of a processing station can include, but are not limited to, conveyor belts, injection molding presses, cutting machines, die stamping machines, extruders, CNC mills, grinders, assembly stations, 3D printers, robotic devices, quality control and validation stations, etc. Example process steps can include, but are not limited to, transporting outputs from one location to another (as performed by a conveyor belt); feeding material into an extruder, melting the material and injecting the material through a mold cavity where it cools and hardens to the configuration of the cavity (as performed by an injection molding presses); cutting material into a specific shape or length (as performed by a cutting machine); pressing material into a particular shape (as performed by a die stamping machine), mixing, bubble columns, vapor deposition, etc.

In manufacturing processes, process stations can run in parallel or in series. When operating in parallel, a single process station can send its intermediate output to more than 1 stations (e.g., 1 to N stations), and a single process station can receive and combine intermediate outputs from more than one to N stations. Moreover, a single process station can perform the same process step or different process steps, either sequentially or non-sequentially, on the received raw material or intermediate output during a single iteration of a manufacturing process.

Operation of each process station can be governed by one or more process controllers. In some implementation, each process station has one or more process controllers (referred to herein as "a station controller") that are programmed to control the operation of the process station (the programming algorithms referred to herein as "control algorithms"). However, in some aspects, a single process controller may be configured to control the operations of two or more process stations. One example of a station controller is a Programmable Logic Controller (PLC). A PLC can be programmed to operate manufacturing processes and systems. The PLC or other controller can receive information from connected sensors or input devices, process the data and generate outputs (e.g., control signals to control an associated process station) based on pre-programmed parameters and instructions.

An operator or control algorithm can provide the station controller with station controller setpoints (or "setpoints" or "controller setpoints" or CSPs) that represent a desired single value or range of values for each control value. The values that can be measured during the operation of a station's equipment or processes can either be classified as control values or station values. A value that is controlled by a station controller can be classified herein as control values, the other measured values will be classified herein as station values. Examples of control and/or station values include, but are not limited to: speed, temperature, pressure, vacuum, rotation, current, voltage, power, viscosity, materials/resources used at the station, throughput rate, outage time, noxious fumes, the type of steps and order of the steps performed at the station. Whether a measured value is classified as a control value or a station value can depend on the particular station and whether the measured value is controlled by a station controller or is simply a byproduct of the operation of the station. During the manufacturing process, control values can be provided to a station controller, while station values may not be provided to a controller.

The control algorithms can also include instructions for monitoring control values, comparing control values to corresponding setpoints and determining what actions to take when the control value is not equal to (or not within a defined range of) a corresponding station controller setpoint. For example, if the measured present value of the temperature for the station is below the setpoint, then a signal may be sent by the station controller to increase the temperature of the heat source for the station until the present value temperature for the station equals the setpoint.

Many process controllers used in the manufacturing process to control a station may be limited, as such controllers follow static algorithms (e.g., on/off control, PI control, PID control, Lead/Lag control) for prescribing what actions to take when a control value deviates from a setpoint.

One or more sensors can be included within or coupled to each process station. These can be physical or virtual sensors that exist in a manufacturing process unrelated to the operation of deep learning processor, as well as any new sensors that can be added to perform any additional measurements required by deep learning processor. Sensors can be used to measure values generated by a manufacturing process such as: station values, control values, intermediate and final output values. Example sensors can include, but are not limited to: rotary encoders for detecting position and speed; sensors for detecting proximity, pressure, temperature, level, flow, current and voltage; limit switches for detecting states such as presence or end-of-travel limits.

A sensor as described herein can include both a sensing device and signal conditioning. For example, the sensing device reacts to the station or control values and the signal conditioner translates that reaction to a signal that can be used and interpreted by deep learning processor or the station controller. Example of sensors that react to temperature are RTDs, thermocouples and platinum resistance probes. Strain gauge sensors react to pressure, vacuum, weight, change in distance among others. Proximity sensors react to objects when they are within a certain distance of each other or a specified tart. With all of these examples, the reaction must be converted to a signal that can be used by a station controller or deep learning processor. In many cases the signal conditioning function of the sensors produce a digital signal that is interpreted by the station controller. The signal conditioner can also produce an analog signal or TTL signal among others. Virtual sensors also known as soft sensors, smart sensors or estimators include system models that can receive and process data from physical sensors.

A process value, as used herein refers to a station value or control value that is aggregated or averaged across an entire series of stations (or a subset of the stations) that are part of the manufacturing process. Process values can include, for example, total throughput time, total resources used, average temperature, average speed.

In addition to station and process values, various characteristics of a process station's product output (i.e., intermediate output or final output) can be measured, for example: temperature, weight, product dimensions, mechanical, chemical, optical and/or electrical properties, number of design defects, the presence or absence of a defect type. The various characteristics that can be measured, will be referred to generally as "intermediate output value" or "final output value." The intermediate/final output value can reflect a single measured characteristic of an intermediate/final output or an overall score based on a specified set of characteristics associated with the intermediate/final output that are measured and weighted according to a predefined formula.

Mechanical properties can include hardness, compression, tack, density and weight. Optical properties can include absorption, reflection, transmission, and refraction. Electrical properties can include electrical resistivity and conductivity. Chemical properties can include enthalpy of formation, toxicity, chemical stability in a given environment, flammability (the ability to burn), preferred oxidation states, pH (acidity/alkalinity), chemical composition, boiling point, vapor point). The disclosed mechanical, optical, chemical and electrical properties are just examples and are not intended to be limiting.

Processes are generally controlled by process controllers utilizing control algorithms such as PID. Overriding the process controllers is another layer of monitoring and control referred to as Statistical Process Control (SPC). The purpose of SPC is to provides alerts if and when a specific process deviates from normal operation. A basic tenant of SPC is that a process controller should not be adjusted unless the process variable being monitored by SPC indicates and an out-of-control condition.

A new methodology for controlling a process is known as Predictive Process Control (PPC), such as that described in U.S. Pat. Nos. 11,156,991 and 11,156,992, which are hereby incorporated by reference in their entireties. In these methods machine learning is used to model the process and make changes to the process in order to optimize process or final product characteristics. Such approach may allow the user may define a confidence threshold that must be achieved before process changes are made or recommended.

One or more techniques provided herein elaborates on the use of Predictive Process Control by providing additional threshold methodology to allow the user to better understand when and how to allow a deep learning processor to make or recommend changes to the process. Such approach may rely on a combination of confidence scores of the deep learning processor, the known limits of the processes, specification limits assigned by the user, and known rules of SPC to signal to the user that a change to the process will positively or negatively affect the process. Such approach may be deployed in real time and communicated to the user through interactive dashboards and notifications.

FIG. 1 illustrates an example manufacturing system 100, according to example embodiments. As shown, manufacturing system 100 may include a factory data system 102, a station control system 104, a first process station 106, a second process station 108, and a deep learning processor 118.

Factory data system 102 may be representative of any factory data system such as, but not limited to, a supervisory control and data acquisition (SCADA) system. A SCADA system can include software and hardware elements that allow industrial entities to control industrial processes locally or at remote locations, monitor, gather, and process real-time data, directly interact with devices such as sensors, valves, pumps, motors, and more through human-machine interface (HMI) software, record events into a log file, etc.

Station control system 104 may be configured to control one or more process stations such as first process station 106 and second process station 108. In some embodiments, station control system 104 may include multiple individual station controllers. Each station controller may be configured to control one or more process stations. For example, a first station controller may be configured to control first process station 106 and a second station controller may be configured to control second process station 108.

In operation, operating instructions can be provided from a factory data system 102 to station control system 104 to monitor or control various aspects of process stations. For example, as shown in FIG. 1, factory data system 102 can provide an operating instruction 101 to station control system 104. Station control system 104 can, in turn, forward the operating instructions to a corresponding process station or stations (e.g., first process station 106 and/or second process station 108) in the form of a control signal or control signals to control the processes of the process stations. For example, as shown, station control system 104 can provide a control signal 115 to first process station 106 based on operating instruction 101; similarly, station control system 104 can provide a control signal 116 to second process station 108 based on operating instruction 101.

As an example, the operating instructions sent from factory data system 102 to station control system 104 may instruct station control system 104 to set a temperature at a process station to 150 deg C. To achieve the desired set temperature, station control system 104 may output a fixed voltage (e.g., a control signal) to a heating element in a corresponding process station such that the temperature is maintained at 150 deg C. In this example, station control system 104 may only vary the output voltage according to the changes indicated by new operating instructions provided by factory data system 102.

In some embodiments, operating instructions 101 may refer to a set of process parameters associated with the manufacturing process. For example, process parameters may include, but is not limited to, setpoints, algorithms, initial input and operating instructions, system and process updates and other control inputs to station control system 104 can be provided by a local data processing system or central data processing system, such as factory data system 102. In some embodiments, such process can be performed manually by an operator. Factory data system 102, in some embodiments, can also receive data output generated by station control system 104, as well as data generated by sensors coupled to or within first process station 106 and second process station 108, or from independent sensors. In some embodiments, data output, may include, but is not limited to: (i) data generated during the manufacturing process (e.g., data logs coupled to physical sensors, process station components, or station controller components); (ii) data received by or transmitted from each process station or station controller and (iii) data communications and data generation patterns of individual or any number of process stations or station controllers (e.g., high data volumes, low data volumes, erratic data volumes, unusual data communication or data generation based on time of day, origin or destination of the data). In some embodiments, factory data system 102 can receive response data. In some embodiments, factory data system 102 can also receive data from related manufacturing processes occurring in remote geographic locations.

Deep learning processor 118 may be configured to simulate the manufacturing processes. In some embodiments, deep learning processor 118 may be representative of a simulator that may be based on predictions, physical laws, statistical regression, or other methods. For example, deep learning processor 118 may undergo a training process, during which deep learning processor 118 may learn to simulate manufacturing processes performed by manufacturing system 100. In this manner, deep learning processor 118 may be configured to determine expected values of an intermediate value, a final output value, or a key performance indicator based on input information. For example, deep learning processor 118 may be configured to determine expected values of an intermediate value, a final output value, or a key performance indicator based on control signals provided by station control system 104 to first process station 106 and/or second process station 108. If the expected value deviates from the actual value, deep learning processor 118 may be trained to recommend changes or adjustments to the manufacturing system to achieve the desired values.

As shown, deep learning processor 118 may receive various information from station control system 104, first process station 106, second process station, 108, and/or one or more external sources to determine the expected values. For example, deep learning processor 118 may receive duplicated control signals 165 from station control system 104. Duplicated control signals 165 may correspond to the control signals sent to first process station 106 (e.g., control signals 115) and/or the control signals sent to second process station 108 (e.g., control signals 116). In some embodiments, In some embodiments, deep learning processor 118 may receive input from one or more process stations. For example, as shown, deep learning processor 118 may receive input 140 from first process station 106. Input 140 may be representative of all values associated with first process station 106. For example, deep learning processor 118 may receive control signals, control values, process values, independent sensor values intermediate output values, and/or final output value from first process station 106.

Similarly, deep learning processor 118 may receive input 141 from second process station 108. Input 141 may be representative of all values associated with second process station 108. For example, deep learning processor 118 may receive control signals, control values, process values, independent sensor values, intermediate output values, and/or final output value from second process station 108.

In some embodiments, as briefly described above, control signals may correspond to signals from station control system 104 to a given process station. For example, a plastic extruder may require heat to condition the plastic during extrusion. In such example, station control system 104 may provide a temperature setpoint, which is the target temperature of the extruder, to first process station 106 and/or second process station 108.

In some embodiments, control values may refer to value outputs from a given process station that may be used as feedback to station control system 104. Continuing with above example, a thermocouple may be placed in proximity of the extruder barrel and the output of this thermocouple may be sent back to station control system 104 to provide feedback for the control loop. In some embodiments, such as those discussed above, the control values may be sent to deep learning processor 118 for further analysis.

In some embodiments, station values may refer to values associated with the process station but not used for control feedback. Continuing with the above example, a thermocouple may be positioned so that the temperature of the plastic after it exits the extruder may be measured.

In some embodiments, intermediate values 130 may refer to values associated a given process station generally relating to a property of the work-in-process product or specimen, but not directly associated with the values used for feedback. Continuing with the above example, the plastic after exiting the extruder may exhibit die swell. This die swell can be measured by non-contact means and may represent an intermediate value.

In some embodiments, final output values 131 may refer to values associated a given process station generally relating to a property of the final product, but not directly associated with the values used for feedback. Continuing with the above example, the plastic after exiting the extruder may exhibit die swell. This die swell can be measured by non-contact means and may represent a final output value. Final output values may be associated with the product specification, which determines if the product is acceptable for final and intended use.

During training of deep learning processor 118, deep learning processor 118 may be trained to predict an expected intermediate value and/or expected final output value based on various inputs. For example, deep learning processor 118 may be trained to generate an expected intermediate value based on one or more of the control signals, control values, or station values. Similarly, deep learning processor 118 may be trained to generate an expected final output value based on one or more of the control signals, control values, station values, or intermediate values.

As those skilled in the art understand, a manufacturing process may be measured by key process indicators (KPIs). Targets may be set by an administrator so that certain KPIs are achieved during processing. For example, common KPIs may include cost and yield (e.g., usable product/raw materials). For such KPIs, deep learning processor 118 may be trained to optimize the manufacturing process to achieve the greatest yield at the lowest cost. Broadly, a KPI may refer to any process value in the manufacturing process, whether it be a native value or a measured value. For example, in some embodiments, a KPI may be a computed value based on one or more intermediate or final output values. For example, a yield may be computed from measurements of final output values that may determine whether the product is acceptable for final or intended use.

Similar to the above process, deep learning processor 118 may be trained to predict an expected KPI value based on various inputs. For example, deep learning processor 118 may be trained to generate an expected KPI value based on one or more of the control signals, control values, or station values.

Once deep learning processor 118 is adequately trained (i.e., the expected values generated in training are within a threshold tolerance of associated actual values), deep learning processor 118 may be deployed to monitor the manufacturing system. In some embodiments, deep learning processor 118, once deployed, may be further configured to optimize the KPIs of a given manufacturing process. For example, deep learning processor 118 may utilize predictive process control techniques to determine whether a state of the manufacturing process should be changed to achieve a desired KPI or improve existing KPIs.

As those skilled in the art understand, a manufacturing process may include one or more process stations, where each process station may be controlled and monitored by one or more parameters. The properties of these parameters may represent the "state" of the process. For example, temperature is parameter of an extrusion process. The temperature is controlled by station control system 104, and may be changed by station control system 104 by adjusting a setpoint of a corresponding process station. In another example, a state of an extruder, may be the temperature. In order to change the state of the manufacturing process, the setpoint may be changed.

There is, however, a subtle difference between a controller setpoint and a state of the manufacturing process. For example, the parameters of a process may be a station value or a control value. In the extruder example, for the extrudate temperature, a station value may be higher than the control value due to heat generated by the work put into the extrudate during processing. While the control value and the station value are related, the station value is the parameter that is of interest. In this case, the temperature of the extrudate can be referred to as the state of the manufacturing process.

In some embodiments, the state of a process may be measured by parameters that the user considers important to the processability or product. These parameters may be either variable or attribute data types. Variable data may refer to information that is continuously measured. Examples of variable data in the manufacturing context may include, but are not limited to: temperature, pressure, weight, and energy. Attribute data may refer to information that is discretely observed and not measured. Examples of attribute data in the manufacturing context may include, but are not limited to, pass/fail, conforming/non-conforming, go/no-go. Attribute data may broadly refer to qualitative data while variable data may refer to quantitative data.

Once deep learning processor 118 is adequately trained to generate expected values, deep learning processor 118 may be deployed to recommend state changes to the manufacturing process. For example, deep learning processor 118 may be configured to run background processes where process station states are changed in an attempt to optimize or improve KPIs. During such process, deep learning processor 118 may be further configured to recommend changes that comply with equipment specifications 170 and user specifications 180.

Equipment specifications 170 may refer to the limits of the process stations. For example, if a given process station cannot exceed a certain temperature, an equipment specification 170 for that process station may be an upper temperature limit. Generally, such equipment specifications may be considered "immutable." In other words, equipment specifications may be specifications that are fixed and cannot be changed. Using another example, an extruder specification for screw speed has a minimum and maximum speed that cannot be exceeded.

User specifications 180 may refer to user specifications for each process station. For example, a user or administrator may specify a processing range of a specific process station. Such user specifications 180 may be a subset of equipment specifications 170. For example, a press may have an operating range of 100°-200° C., but the user specification may be narrower, e.g., 125°-150° C. In some embodiments, a user may further specify a requirement of the intermediate or final output values. For example, a user may specify that an intermediate output may have a specification to weight between 500 and 510 grams.

In some embodiments, user specifications 180 may be mutable specifications. In other words, user specifications 180 may include a subset of user specifications that can be changed. Continuing with the above example, the user's narrower range of 125°-150° C. can be changed to be broader or narrower, as long as the range is within the immutable limits of the equipment.

In some embodiments, deep learning processor 118 may be in communication with a display output 190. In some embodiments, display output 190 may be representative of a display device in wired or wireless communication with deep learning processor 118. In some embodiments, display output 190 may be representative of a computing system (e.g., desktop, laptop, mobile device, tablet, etc.) in wired or wireless communication with deep learning processor 118.

In some embodiments, a user interface may be displayed via display output 190. The user interface may depict a dashboard or report corresponding to the manufacturing process. For example, the interface may provide one or more of historical data of each process station, real-time data of each process station (e.g., actual values of each process station), expected values of each process station, actual KPIs, and expected KPIs.

Figure 2:
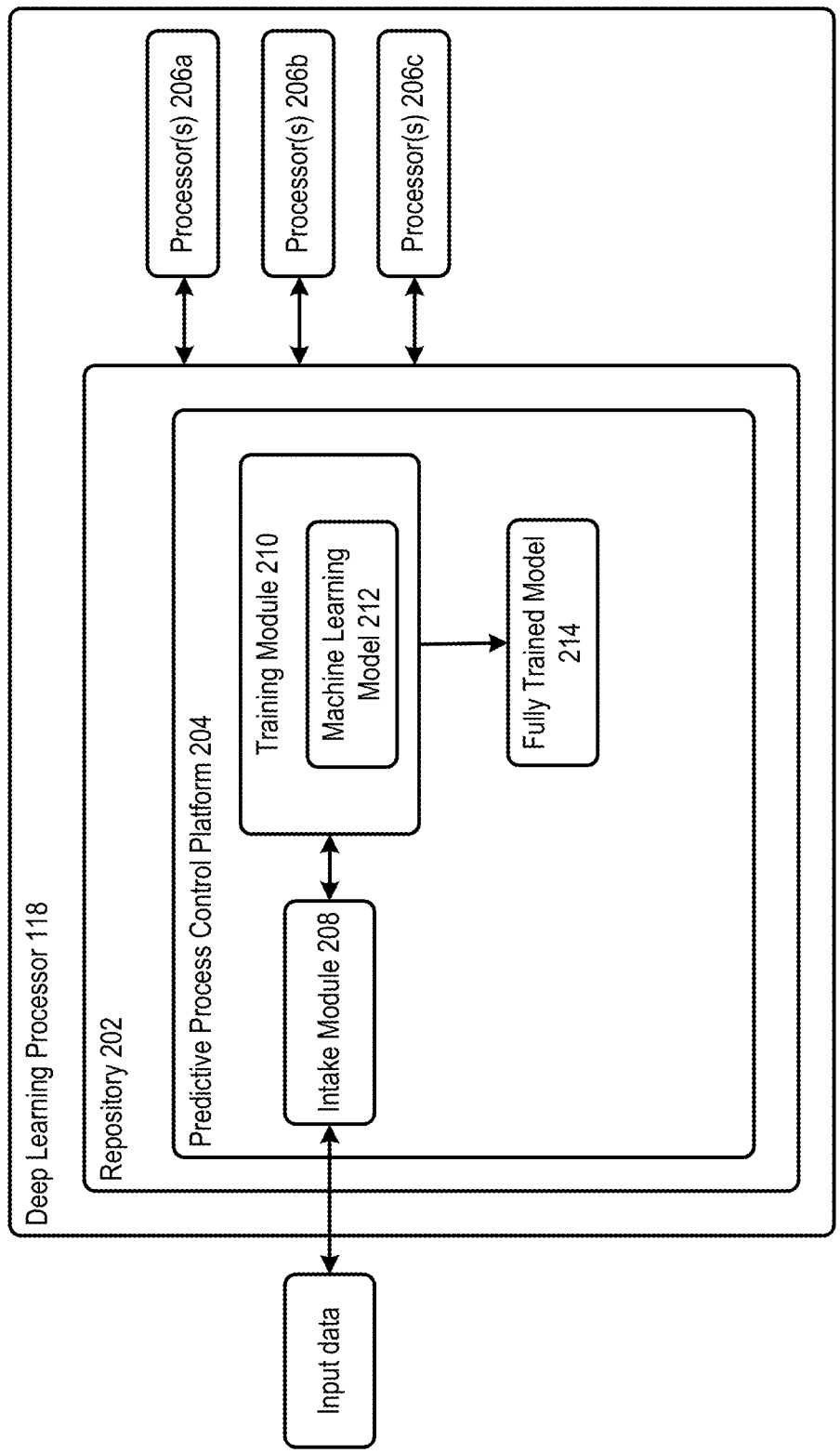
FIG. 2 is a block diagram illustrating a deep learning processor, according to example embodiments.

FIG. 2 is a block diagram of deep learning processor 118, according to example embodiments. As shown, deep learning processor 118 may include a repository 202. The repository 202 can include one or more data storage nodes that may include instructions. The repository 202 can interact with processors 206a, 206b, and/or 206c to implement a predictive process control platform 204 as described herein.

Predictive process control platform 204 may be configured to train a model using a training data set to generate expected values. In some embodiments, the expected values may include expected control values, expected station values, expected intermediate values, expected KPIs, and/or expected final output values. Predictive process control platform 204 may include intake module 208 and training module 210. Each of intake module 208 and training module 210 may be comprised of one or more software modules. The one or more software modules may be collections of code or instructions stored on a media (e.g., memory of deep learning processor 118) that represent a series of machine instructions (e.g., program code) that implements one or more algorithmic steps. Such machine instructions may be the actual computer code the processor interprets to implement the instructions or, alternatively, may be a higher level of coding of the instructions that is interpreted to obtain the actual computer code. The one or more software modules may also include one or more hardware components. One or more aspects of an example algorithm may be performed by the hardware components (e.g., circuitry) itself, rather as a result of the instructions.

Intake module 208 can obtain or receive a training data set. In some embodiments, the training data set can include actual values. Exemplary actual values may include, but are not limited to, actual control values, actual station values, actual intermediate values, actual KPI targets, and/or actual final output values. In some embodiments, intake module 208 may be configured to generate a robust data set. To create a robust data set for the conditioning of the machine learning models, setpoints (or other control inputs) corresponding to each control value of each process station can be adjusted, in a systematic manner (e.g., from a minimum value to a maximum value), for every value (or a subset of values) that will yield in-specification final outputs. In further embodiments, setpoints (or other control inputs), corresponding to each control value of each process station can be adjusted, in a systematic manner (e.g., from a minimum value to a maximum value), for every value (or a subset of values) at which a process station is capable of operating (i.e., the entire range of values that a process station is capable of operating at, not just limited to what will yield in-specification final outputs). Further, any number and any combination of setpoints can be adjusted for training purposes. The setpoints (or other control inputs) can be adjusted manually, by pre-programmed algorithms, or by predictive process control.

Training module 210 may be configured to train machine learning model 212 to generate expected values based on the actual values to generate fully trained model 214. For example, machine learning model 212 may be trained to evaluate control/station/process values, intermediate values, final output values, and determine adjustments to a station controller's input. As understood by those of skill in the art, machine learning based techniques can vary depending on the desired implementation, without departing from the disclosed technology. For example, machine learning techniques can utilize one or more of the following, alone or in combination: hidden Markov models; recurrent neural networks; convolutional neural networks (CNNs); deep learning; Bayesian symbolic methods; reinforcement learning, general adversarial networks (GANs); support vector machines; image registration methods; applicable rule-based system.

Machine learning models can also be based on clustering algorithms (e.g., a Minibatch K-means clustering algorithm), a recommendation algorithm (e.g., a Miniwise Hashing algorithm, or Euclidean Locality-Sensitive Hashing (LSH) algorithm), and/or an anomaly detection algorithm, such as a Local outlier factor. The machine learning models can be based on supervised and/or unsupervised methods.

In some embodiments, a transformer architecture may be used to predict the expected values over a short future time period based on, for example, observed values (e.g., station values, control values, KPIs, etc.) over a time interval. In some embodiments, a mask may be used to restrict machine learning model's 212 attention to data from a recent time interval, such as the past 20 seconds, and to predict the subsequent time interval, such as the next 20 seconds. Fully trained model 214 may also be evaluated to predict the results, over a short time interval in the future, of a proposed change in observed values at the current time.

In some embodiments, training and testing may be complete based on a generated confidence level of its prediction at an instant or over a specific time period. Such confidence level may provide a measure of statistical confidence in the prediction. In some embodiments, the confidence level may be expressed as a numerical probability of accuracy for the prediction. In some embodiments, the confidence level may be expressed as an interval or probability range.

Figure 3:
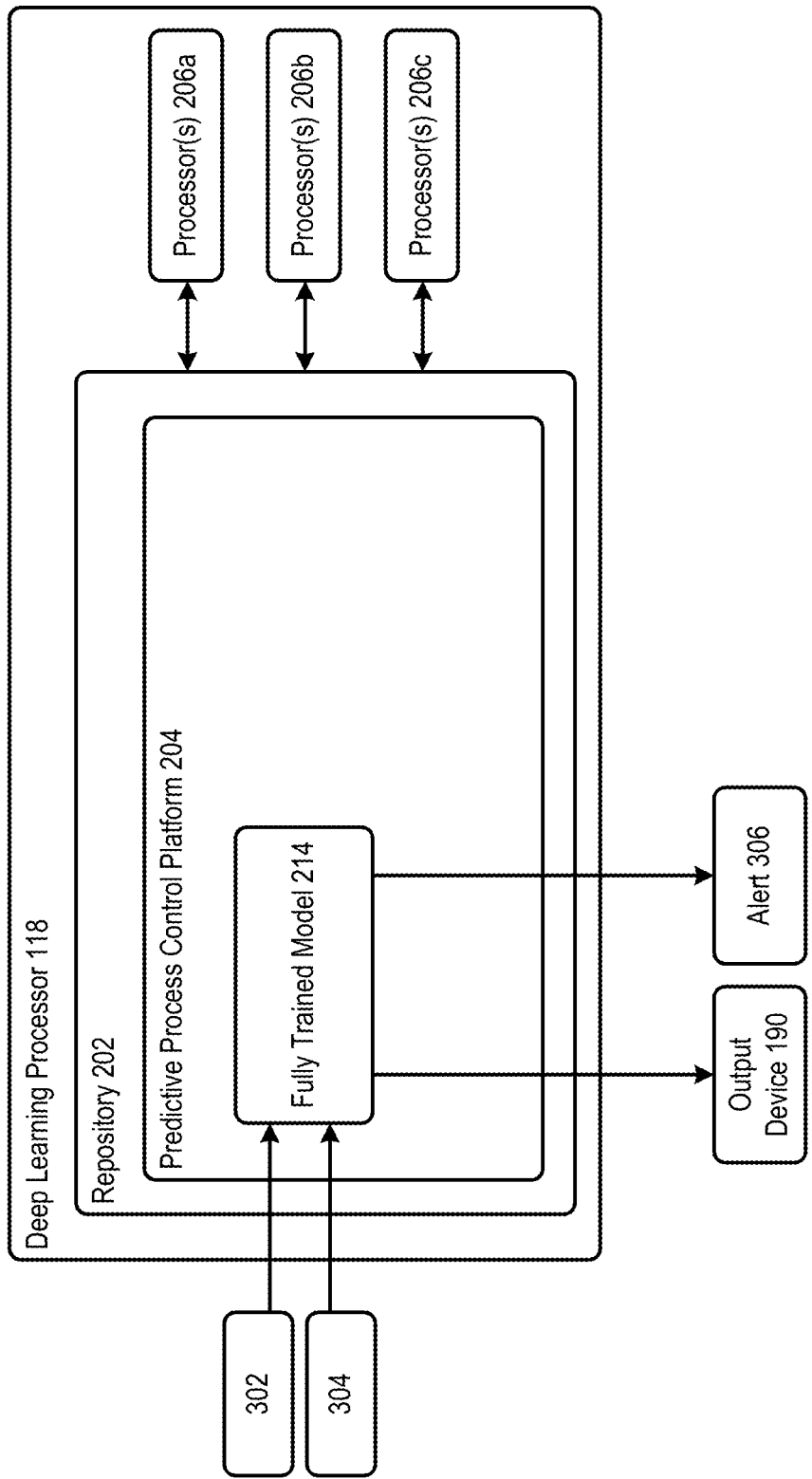
FIG. 3 is a block diagram illustrating a deep learning processor, according to example embodiments.

FIG. 3 is a block diagram of deep learning processor 118, according to example embodiments. As shown, after fully trained model 214 achieves a threshold level of confidence, it may be deployed to generate proposed state changes.

As shown, fully trained model 214 may receive, as input, desired values for process values 302 and KPI targets 304. In some embodiments, desired values for process values 302 may include, but are not limited to, desired station values, intermediate output values, final output values, control values, independent sensor values, or, generally, any other data that may be associated with a process station of manufacturing system 100.

Based on the desired process values 302 and KPI targets 304, fully trained model 214 may be able to simulate the manufacturing process to generate expected process values and expected targets for a given KPI or set of KPIs. For example, deep learning processor 118 may simulate the manufacturing process, via fully trained model 214, using a set of setpoints, algorithms, initial inputs and/or operating instructions that would normally be provided from factory data system 102 to station control system 104. Deep learning processor 118 may generate a set of setpoints, algorithms, initial inputs and/or operating instructions for the simulation. In some embodiments, the generated set of setpoints, algorithms, initial inputs and/or operating instructions may include a state change to the manufacturing process. The state change may be a change to one or more parameters of a process station or a set of process stations compared to "normal" or existing manufacturing parameters. Using the set of setpoints, algorithms, initial inputs and/or operating instructions, deep learning processor 118 may simulate the manufacturing process to generate expected process values and expected targets for a set of KPIs.

In some embodiments, as output, deep learning processor 118 may provide the proposed state change as an alert 306 to the user. In some embodiments, as output, deep learning processor 118 may provide the proposed state change directly to factory data system 102 and/or station control system 104.

Figure 4:
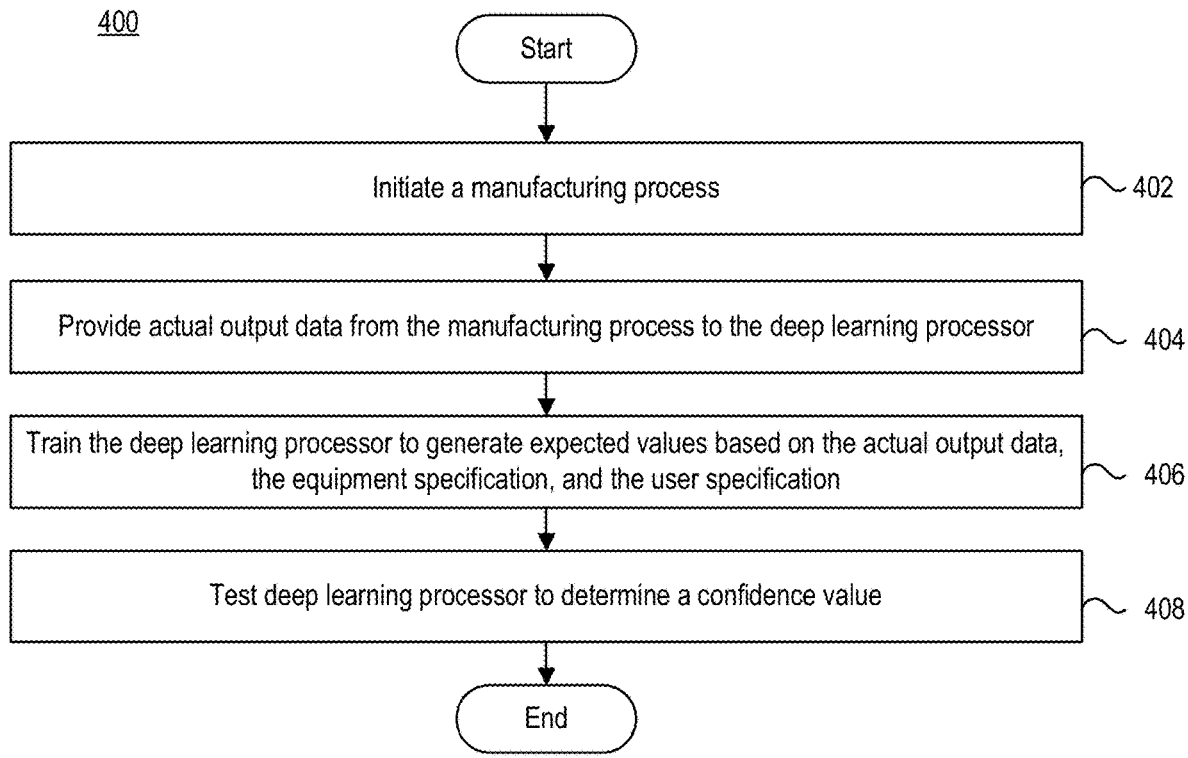
FIG. 4 is a flow diagram illustrating a method of training a deep learning processor to generate an expected value, according to example embodiments

FIG. 4 is a flow diagram illustrating a method 400 of training a deep learning processor to generate an expected value, according to example embodiments. Method 400 may begin at step 402.

At step 402, a manufacturing process may be initiated. For example, a manufacturing process in manufacturing system 100 may be initiated by factory data system 102. Factory data system 102 may provide operating instructions to station control system 104. Station control system 104 may then provide each process station with appropriate control signals based on the operating instructions.

At step 404, deep learning processor 118 may receive actual output data from the manufacturing process. In some embodiments, actual output data from the manufacturing process may include, but is not limited to, control values received from station control system 104, station values received from first process station 106 and/or second process station 108, intermediate values generated by first process station 106 and/or second process station 108, final output values, and/or data indicative of KPIs.

In some embodiments, the actual output may include actual output from various phases of the manufacturing process. For example, deep learning processor 118 may receive actual output data during start up, ramp up, shut down, ramp down, idle, normal production, and the like. Further, in some embodiments, process setpoints of the manufacturing system may be adjusted or modified to additional actual outputs to generate a more robust training set for deep learning processor 118. In this manner, deep learning processor 118 can be trained on both stable data (e.g., normal production data) and unstable data (e.g., start up, ramp up, shut down, etc.). In some embodiments, stable data may refer to data obtained during the manufacturing process when manufacturing system 100 is producing in-specification product. In some embodiments, stable data may refer to data obtained during the manufacturing process when the manufacturing process is running within statistical process control.

At step 406, deep learning processor 118 may be trained to generated expected values. In some embodiments, deep learning processor 118 may be trained based on the actual output data, the equipment specification to generate expected values. In some embodiments, the expected values may include expected control values, expected station values, expected intermediate values, expected KPIs, and/or expected final output values.

At step 408, deep learning processor 118 may be tested to determine a confidence level for its prediction. For example, deep learning processor 118 may provide a confidence level for its prediction at an instant or over a specific time period, for example, to provide a measure of statistical confidence in the prediction. In some embodiments, the confidence level may be expressed as a numerical probability of accuracy for the prediction. In some embodiments, the confidence level may be expressed as an interval or probability range.

If the predictions generated by deep learning processor 118 are correct, over a specified time period and within a predefined threshold confidence level, then deep learning processor 118 can assume control of the manufacturing process.

Figure 5:
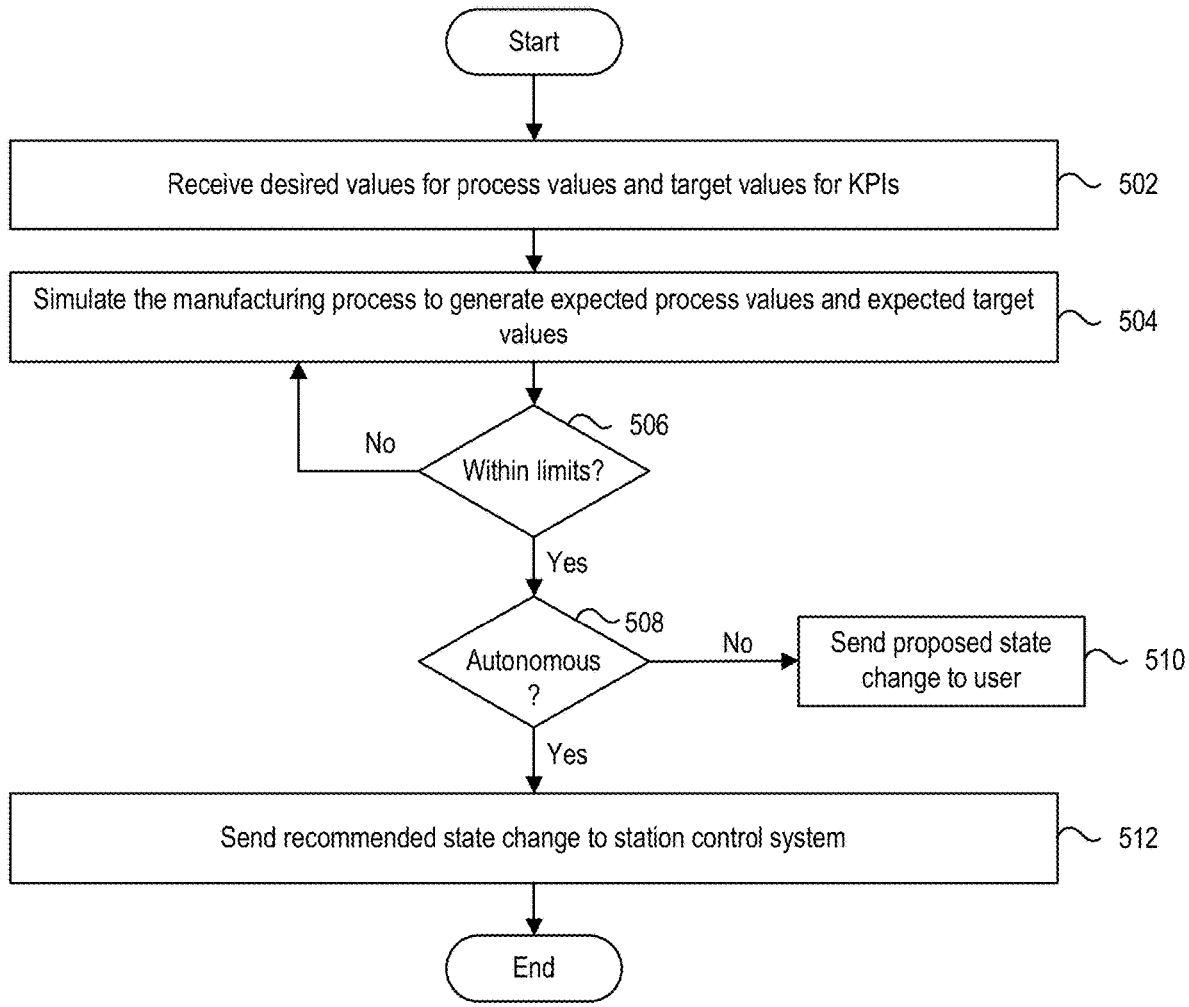
FIG. 5 is a flow diagram illustrating a method of generating a recommended state change for the manufacturing process, according to example embodiments.

FIG. 5 is a flow diagram illustrating a method 500 of generating a recommended state change for the manufacturing process, according to example embodiments. Method 500 may begin at step 502. As provided above, once deep learning processor 118 is trained to generate expected values within the predefined threshold confidence level, deep learning processor 118 may be deployed to recommend state changes to the manufacturing process.

At step 502, deep learning processor 118 may receive desired values for process values and KPI targets. In some embodiments, desired values for process values may include, but are not limited to, desired station values, intermediate output values, final output values, control values, independent sensor values, or, generally, any other data that may be associated with a process station of manufacturing system 100. In some embodiments, a desired KPI target may be a desired target value for a given KPI. For example, for an "increased throughput" KPI, a desired target value for this KPI may be an increase of "10%."

At step 504, deep learning processor 118 may simulate the manufacturing process to generate expected process values and expected targets for a given KPI or set of KPIs. For example, deep learning processor 118 may simulate the manufacturing process using a set of setpoints, algorithms, initial inputs and/or operating instructions that would normally be provided from factory data system 102 to station control system 104. Deep learning processor 118 may generate a set of setpoints, algorithms, initial inputs and/or operating instructions for the simulation. In some embodiments, the generated set of setpoints, algorithms, initial inputs and/or operating instructions may include a state change to the manufacturing process. The state change may be a change to one or more parameters of a process station or a set of process stations compared to "normal" or existing manufacturing parameters. Using the set of setpoints, algorithms, initial inputs and/or operating instructions, deep learning processor 118 may simulate the manufacturing process to generate expected process values and expected targets for a set of KPIs.

At step 506, deep learning processor 118 may determine whether the expected process values and expected target values for a set of KPIs are within acceptable limits of the desired process values and desired target values. For example, deep learning processor 118 may compare the desired values for process values and the desired target values for the set of KPIs to the expected process values and the expected targets for a given KPI.

If, at step 506, deep learning processor 118 determines that the expected process values and expected target values for a set of KPIs are not within acceptable limits of the desired process values and desired target values, then method 500 may revert to step 504, and deep learning processor 118 may simulate the manufacturing process with a state change.

If, however, at step 506, deep learning processor 118 determines that the expected process values and expected target values for a set of KPIs are within acceptable limits of the desired process values and desired target values, then method 500 may proceed to step 508. At step 508, deep learning processor 118 may determine whether the state change is autonomous. In other words, deep learning processor 118 may determine whether the state change can be done with or without user interaction.

If, at step 508, deep learning processor 118 determines that the state change is not autonomous, then method 500 may proceed to step 510. At step 510, deep learning processor 118 provides the recommended state change to an end user or admin. If, at step 508, deep learning processor 118 determines that the state change is autonomous, the method 500 may proceed to step 512. At step 512, deep learning processor 118 may provide the recommended state changes to factory data system 102 and/or station control system 104.

Figure 6:
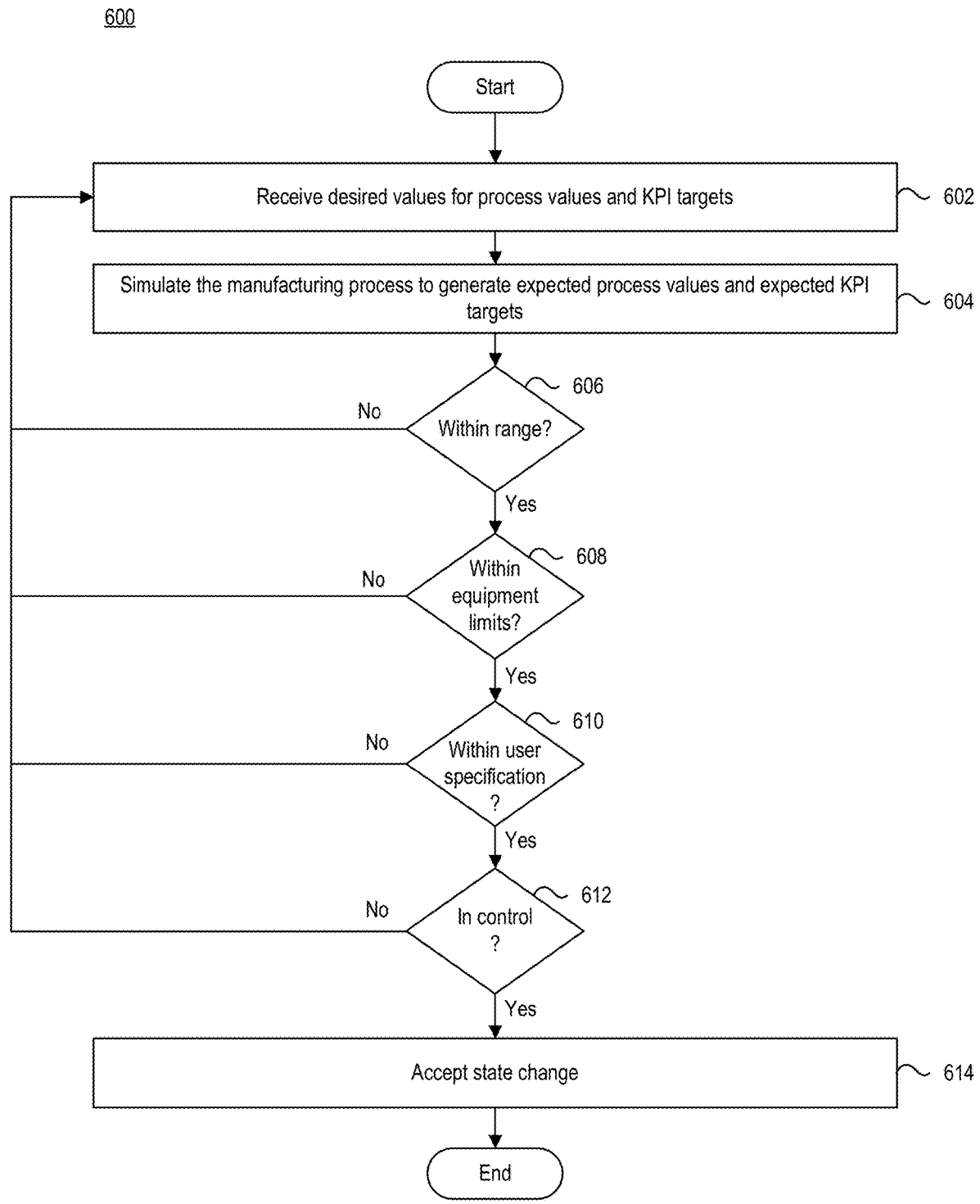
FIG. 6 is a flow diagram illustrating a method of generating a recommended state change for the manufacturing process, according to example embodiments.

FIG. 6 is a flow diagram illustrating a method 600 of generating a recommended state change for the manufacturing process, according to example embodiments. Method 600 may begin at step 602.

At step 602, deep learning processor 118 may receive desired values for process values and KPI targets. In some embodiments, desired values for process values may include, but are not limited to, desired station values, intermediate output values, final output values, control values, independent sensor values, or, generally, any other data that may be associated with a process station of manufacturing system 100. In some embodiments, a desired KPI target may be a desired target value for a given KPI. For example, for an "increased throughput" KPI, a desired target value for this KPI may be an increase of "10%."

At step 604, deep learning processor 118 may simulate the manufacturing process to generate expected process values and expected targets for a given KPI or set of KPIs. For example, deep learning processor 118 may simulate the manufacturing process using a set of setpoints, algorithms, initial inputs and/or operating instructions that would normally be provided from factory data system 102 to station control system 104. Deep learning processor 118 may generate a set of setpoints, algorithms, initial inputs and/or operating instructions for the simulation. In some embodiments, the generated set of setpoints, algorithms, initial inputs and/or operating instructions may include a state change to the manufacturing process. The state change may be a change to one or more parameters of a process station or a set of process stations compared to "normal" or existing manufacturing parameters. Using the set of setpoints, algorithms, initial inputs and/or operating instructions, deep learning processor 118 may simulate the manufacturing process to generate expected process values and expected targets for a set of KPIs.

During such simulation, deep learning processor 118 may make a state change to the manufacturing process. The state change may be a change to one or more parameters of a process station or a set of process stations compared to "normal" or existing manufacturing parameters.

At step 606, deep learning processor 118 may determine whether the expected process values and expected target values for a set of KPIs are within acceptable limits of the desired process values and desired target values. For example, deep learning processor 118 may compare the desired values for process values and the desired target values for the set of KPIs to the expected process values and the expected targets for a given KPI.

If, at step 606, deep learning processor 118 determines that the expected process values and expected target values for a set of KPIs are not within acceptable limits of the desired process values and desired target values, then method 600 may revert to step 604, and deep learning processor 118 may simulate the manufacturing process with a state change.

If, however, at step 606, deep learning processor 118 determines that the expected process values and expected target values for a set of KPIs are within acceptable limits of the desired process values and desired target values, then method 600 may proceed to step 608.

At step 608, deep learning processor 118 may determine whether the state change is within the equipment limits of manufacturing system 100. Generally, each piece of manufacturing equipment may have a set of specifications that define upper and lower bounds for various attributes (e.g., temperature, speed, etc.) of the equipment. For example, if the proposed state change is to raise the temperature of a process station to 400° C., and the temperature limit of the process station is 200° C., then it would not be possible to make that state change to the manufacturing process.

If, at step 608, deep learning processor 118 determines that the state change is not within the equipment limits of manufacturing system 100, then method 600 may revert to step 604, and deep learning processor 118 may simulate the manufacturing process with a state change. If, however, at step 608, deep learning processor 118 determines that the state change is within the equipment limits of manufacturing system 100, then method 600 may proceed to step 610.

At step 610, deep learning processor 118 may determine whether the expected values (e.g., expected control values and/or expected target values for the set of KPIs) are within the user specifications. For example, as provided above, user specifications may refer to user specifications for each process station. Such user specifications may be a subset of equipment specifications. For example, a press may have an operating range of 100°-200° C., but the user specification may be narrower, e.g., 125°-150° C.

If, at step 610, deep learning processor 118 determines that the expected values are not within the user specifications, then method 600 may revert to step 604, and deep learning processor 118 may simulate the manufacturing process with a state change. If, however, at step 610, deep learning processor 118 determines that expected values are within the user specifications, then method 600 may proceed to step 612.

At step 612, deep learning processor 118 may determine whether the expected values are in statistical process control. For example, if the expected value is greater than +/− three sigma from the average process value, it may be considered out of control. If, at step 612, deep learning processor 118 determines that the expected values are not within statistical process control, then method 600 may revert to step 604, and deep learning processor 118 may simulate the manufacturing process with a state change. If, however, at step 610, deep learning processor 118 determines that the expected values are within statistical process control, then method 600 may proceed to step 614.

At step 614, deep learning processor 118 may accept the state change. In some embodiments, accepting the state change may include deep learning processor 118 providing the recommended state change to an end user or admin. In some embodiments, accepting the state change may include deep learning processor 118 providing the recommended state changes to factory data system 102 and/or station control system 104.

Figure 7:
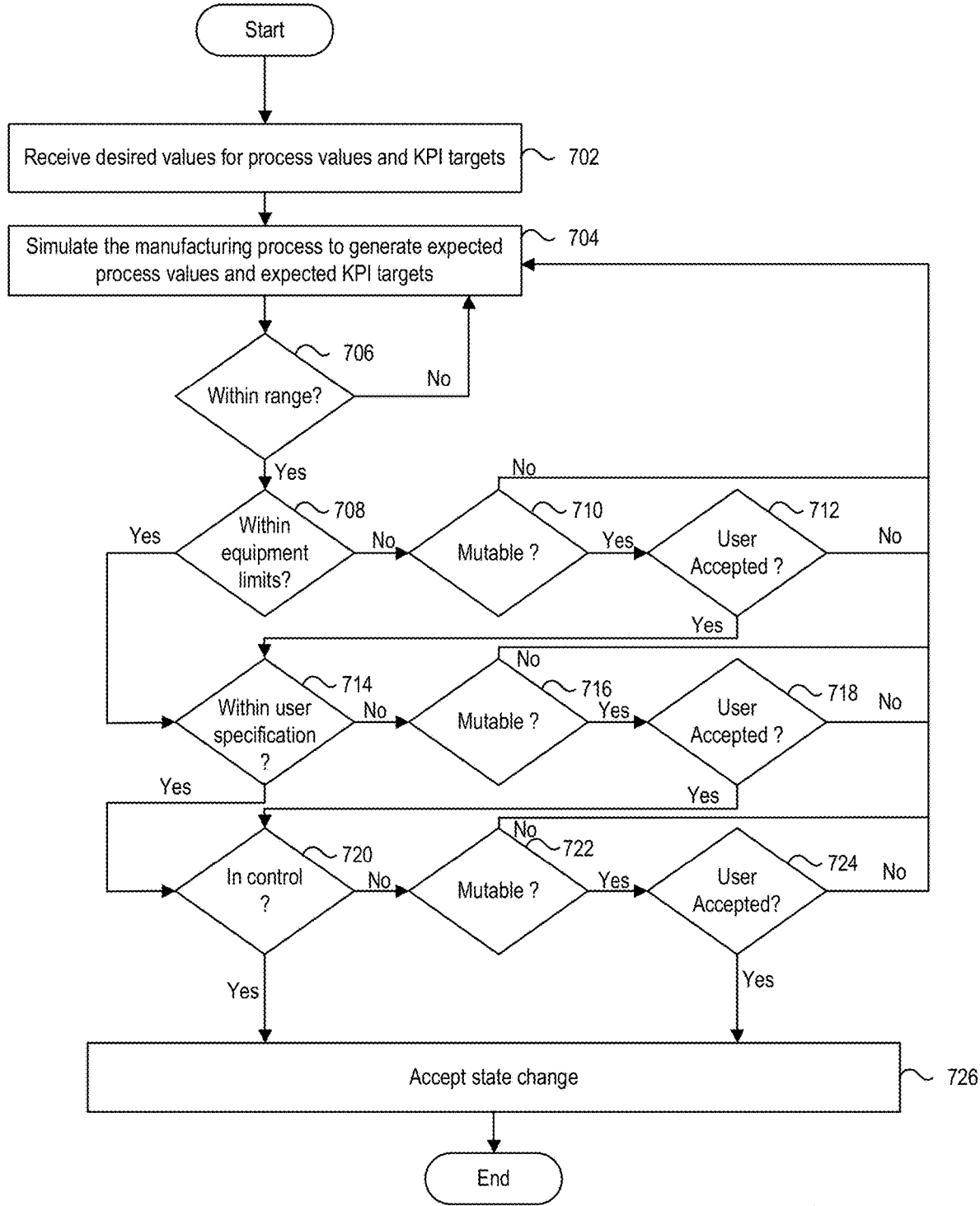
FIG. 7 is a flow diagram illustrating a method of generating a recommended state change for the manufacturing process, according to example embodiments.

FIG. 7 is a flow diagram illustrating a method 700 of generating a recommended state change for the manufacturing process, according to example embodiments. Method 700 may begin at step 702.

At step 702, deep learning processor 118 may receive desired values for process values and KPI targets. In some embodiments, desired values for process values may include, but are not limited to, desired station values, intermediate output values, final output values, control values, independent sensor values, or, generally, any other data that may be associated with a process station of manufacturing system 100. In some embodiments, a desired KPI target may be a desired target value for a given KPI. For example, for an "increased throughput" KPI, a desired target value for this KPI may be an increase of "10%."

At step 704, deep learning processor 118 may simulate the manufacturing process to generate expected process values and expected targets for a given KPI or set of KPIs. For example, deep learning processor 118 may simulate the manufacturing process using a set of setpoints, algorithms, initial inputs and/or operating instructions that would normally be provided from factory data system 102 to station control system 104. Deep learning processor 118 may generate a set of setpoints, algorithms, initial inputs and/or operating instructions for the simulation. In some embodiments, the generated set of setpoints, algorithms, initial inputs and/or operating instructions may include a state change to the manufacturing process. The state change may be a change to one or more parameters of a process station or a set of process stations compared to "normal" or existing manufacturing parameters. Using the set of setpoints, algorithms, initial inputs and/or operating instructions, deep learning processor 118 may simulate the manufacturing process to generate expected process values and expected targets for a set of KPIs.

At step 706, deep learning processor 118 may determine whether the expected process values and expected target values for a set of KPIs are within acceptable limits of the desired process values and desired target values. For example, deep learning processor 118 may compare the desired values for process values and the desired target values for the set of KPIs to the expected process values and the expected targets for a given KPI.

If, at step 706, deep learning processor 118 determines that the expected process values and expected target values for a set of KPIs are not within acceptable limits of the desired process values and desired target values, then method 700 may revert to step 704, and deep learning processor 118 may simulate the manufacturing process with a different state change.

If, however, at step 706, deep learning processor 118 determines that the expected process values and expected target values for a set of KPIs are within acceptable limits of the desired process values and desired target values, then method 700 may proceed to step 708.

At step 708, deep learning processor 118 may determine whether the state change is within the equipment limits of manufacturing system 100. Generally, each piece of manufacturing equipment may have a set of specifications that define upper and lower bounds for various attributes (e.g., temperature, speed, etc.) of the equipment. For example, if the proposed state change is to raise the temperature of a process station to 400° C., and the temperature limit of the process station is 200° C., then it would not be possible to make that state change to the manufacturing process.

If, at step 708, deep learning processor 118 determines that the state change is within the equipment limits, then method 700 may proceed to step 714, discussed in more detail below. If, however, at step 708, deep learning processor 118 determines that the state change is not within the equipment limits of manufacturing system 100, then method 700 may proceed to step 710.

At step 710, deep learning processor 118 may determine whether the equipment limits are mutable. For example, generally, such equipment specifications may be considered "immutable." In other words, equipment specifications may be specifications that are fixed and cannot be changed. In some embodiments, some equipment specifications may be mutable. For example, a manufacturer may set a minimum and maximum speed for a screw, but a manufacturer may be able to adjust those minimum and maximum speeds so that the initial minimum and maximum values can be exceeded.

If, at step 710, deep learning processor 118 determines that the equipment limits are not mutable, then method 700 may revert to step 704, and deep learning processor 118 may simulate the manufacturing process with a different state change. If, however, at step 710, deep learning processor 118 determines that the equipment limits are mutable, then method 700 may proceed to step 712.

At step 712, deep learning processor 118 may determine whether a user accepts the recommended state change. For example, at step 712, deep learning processor 118 may notify the user that the state change requires a change to the equipment limits. If, at step 712, deep learning processor 118 determines that the user does not accept the recommended state change, then method 700 may revert to step 704, and deep learning processor 118 may simulate the manufacturing process with a different state change. If, however, at step 712, deep learning processor 118 determines that the user does accept the recommended state change, then method 700 may proceed to step 714.

At step 714, deep learning processor 118 may determine whether the expected values (e.g., expected control values and/or expected target values for the set of KPIs) are within the user specifications. For example, as provided above, user specifications may refer to user specifications for each process station. Such user specifications may be a subset of equipment specifications. For example, a press may have an operating range of 100°-200° C., but the user specification may be narrower, e.g., 125°-150° C.

If, at step 714, deep learning processor 118 determines that expected values are within the user specifications, then method 700 may proceed to step 720. If, however, at step 714, deep learning processor 118 determines that the expected values are not within the user specifications, then method 700 may proceed to step 716.

At step 716, deep learning processor 118 may determine whether the user specifications are mutable. If, at step 716, deep learning processor 118 determines that the user specifications are not mutable, then method 700 may revert to step 704, and deep learning processor 118 may simulate the manufacturing process with a different state change. If, however, at step 716, deep learning processor 118 determines that the user specifications are mutable, then method 700 may proceed to step 718.

At step 718, deep learning processor 118 may determine whether a user accepts the recommended state change. For example, at step 718, deep learning processor 118 may notify the user that the state change requires a change to the user specifications. If, at step 718, deep learning processor 118 determines that the user does not accept the recommended state change, then method 700 may revert to step 704, and deep learning processor 118 may simulate the manufacturing process with a different state change. If, however, at step 718, deep learning processor 118 determines that the user does accept the recommended state change, then method 700 may proceed to step 720.

At step 720, deep learning processor 118 may determine whether the expected values are in statistical process control. If, at step 720, deep learning processor 118 determines that the expected values are within statistical process control, then method 700 may proceed to step 726. If, however, at step 720, deep learning processor 118 determines that the expected values are not within statistical process control, then method 700 may proceed to step 722.

At step 722, deep learning processor 118 may determine whether the statistical process control is mutable. If, at step 722, deep learning processor 118 determines that the statistical process control is not mutable, then method 700 may revert to step 704, and deep learning processor 118 may simulate the manufacturing process with a different state change. If, however, at step 722, deep learning processor 118 determines that the statistical process control is mutable, then method 700 may proceed to step 724.

At step 724, deep learning processor 118 may determine whether a user accepts the recommended state change. For example, at step 724, deep learning processor 118 may notify the user that the state change requires a change to the statistical process control. If, at step 724, deep learning processor 118 determines that the user does not accept the recommended state change, then method 700 may revert to step 704, and deep learning processor 118 may simulate the manufacturing process with a different state change. If, however, at step 724, deep learning processor 118 determines that the user does accept the recommended state change, then method 700 may proceed to step 726.

At step 726, deep learning processor 118 may accept the state change. In some embodiments, accepting the state change may include deep learning processor 118 providing the recommended state change to an end user or admin. In some embodiments, accepting the state change may include deep learning processor 118 providing the recommended state changes to factory data system 102 and/or station control system 104.

Figure 8:
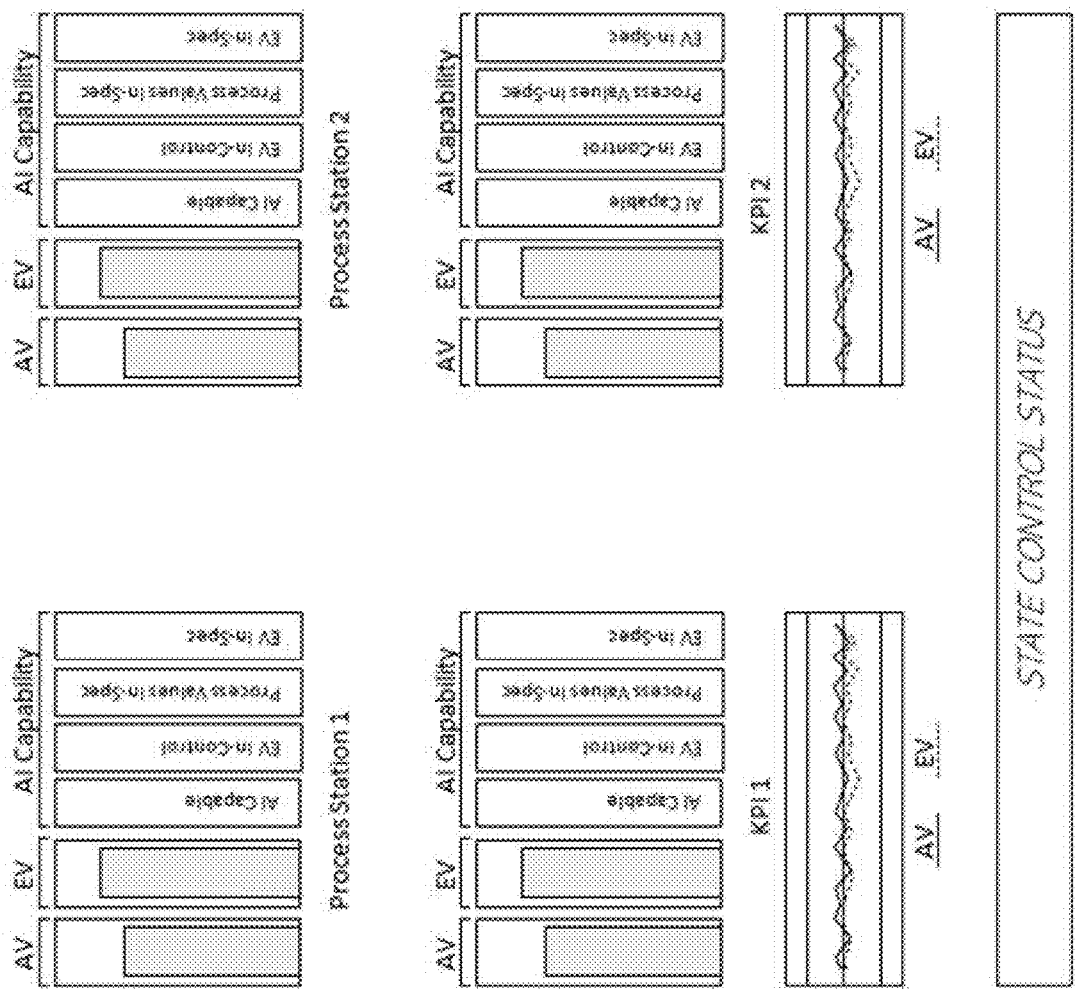
FIG. 8 illustrates an exemplary dashboard, according to example embodiments.

FIG. 8 illustrates an exemplary dashboard 800, according to example embodiments. Dashboard 800 may be generated by deep learning processor 118. Dashboard 800 may visually indicate the comparisons between various expected values (i.e., values generated by deep learning processor 118) and actual values. For example, dashboard 800 may provide one or more of historical data of each process station (date range can be specified), real time data of each process station (e.g., actual values of each process station), expected values of each station, actual KPI targets, and expected KPI targets.

Figure 9A:
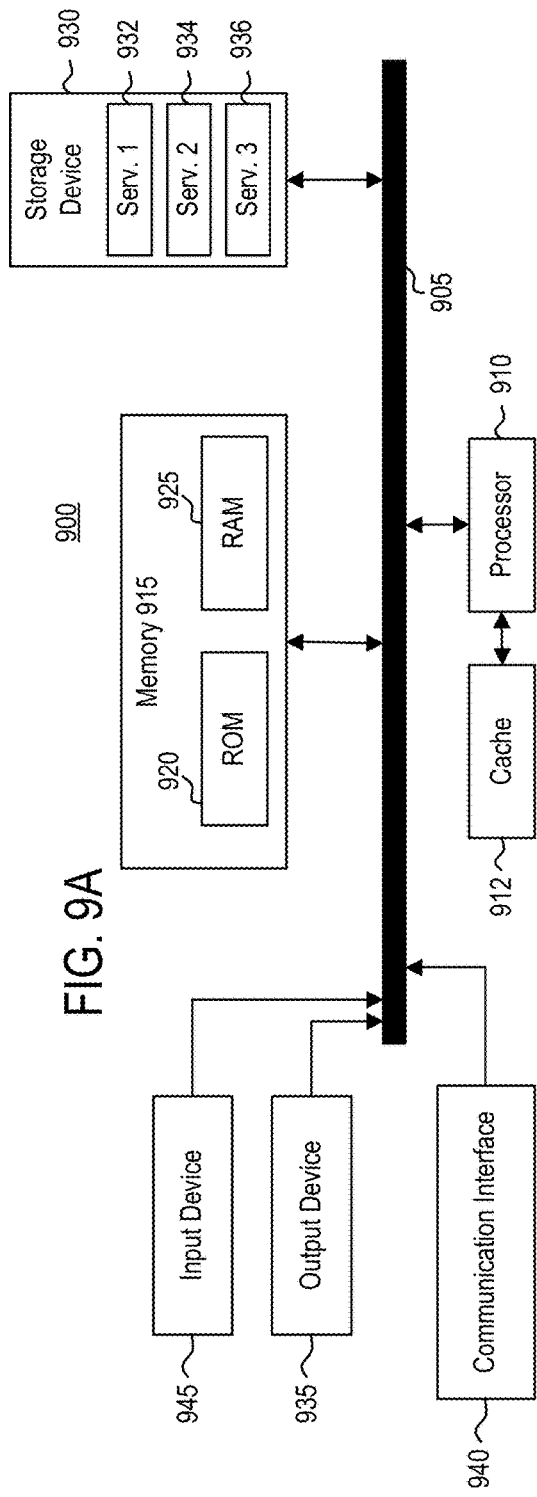
FIG. 9A illustrates an architecture of a computing system, according to example embodiments.

FIG. 9A illustrates an architecture of computing system 900, according to example embodiments. System 900 may be representative of at least a portion of deep learning processor 118. One or more components of system 900 may be in electrical communication with each other using a bus 905. System 900 may include a processing unit (CPU or processor) 910 and a system bus 905 that couples various system components including the system memory 915, such as read only memory (ROM) 920 and random access memory (RAM) 925, to processor 910. System 900 may include a cache of high-speed memory connected directly with, in close proximity to, or integrated as part of processor 910. System 900 may copy data from memory 915 and/or storage device 930 to cache 912 for quick access by processor 910. In this way, cache 912 may provide a performance boost that avoids processor 910 delays while waiting for data. These and other modules may control or be configured to control processor 910 to perform various actions. Other system memory 915 may be available for use as well. Memory 915 may include multiple different types of memory with different performance characteristics. Processor 910 may include any general purpose processor and a hardware module or software module, such as service 1 932, service 2 934, and service 3 936 stored in storage device 930, configured to control processor 910 as well as a special-purpose processor where software instructions are incorporated into the actual processor design. Processor 910 may essentially be a completely self-contained computing system, containing multiple cores or processors, a bus, memory controller, cache, etc. A multi-core processor may be symmetric or asymmetric.

To enable user interaction with the computing system 900, an input device 945 may represent any number of input mechanisms, such as a microphone for speech, a touch-sensitive screen for gesture or graphical input, keyboard, mouse, motion input, speech and so forth. An output device 935 (e.g., display) may also be one or more of a number of output mechanisms known to those of skill in the art. In some instances, multimodal systems may enable a user to provide multiple types of input to communicate with computing system 900. Communications interface 940 may generally govern and manage the user input and system output. There is no restriction on operating on any particular hardware arrangement and therefore the basic features here may easily be substituted for improved hardware or firmware arrangements as they are developed.

Storage device 930 may be a non-volatile memory and may be a hard disk or other types of computer readable media which may store data that are accessible by a computer, such as magnetic cassettes, flash memory cards, solid state memory devices, digital versatile disks, cartridges, random access memories (RAMs) 925, read only memory (ROM) 920, and hybrids thereof.

Storage device 930 may include services 932, 934, and 936 for controlling the processor 910. Other hardware or software modules are contemplated. Storage device 930 may be connected to system bus 905. In one aspect, a hardware module that performs a particular function may include the software component stored in a computer-readable medium in connection with the necessary hardware components, such as processor 910, bus 905, output device 935, and so forth, to carry out the function.

Figure 9B:
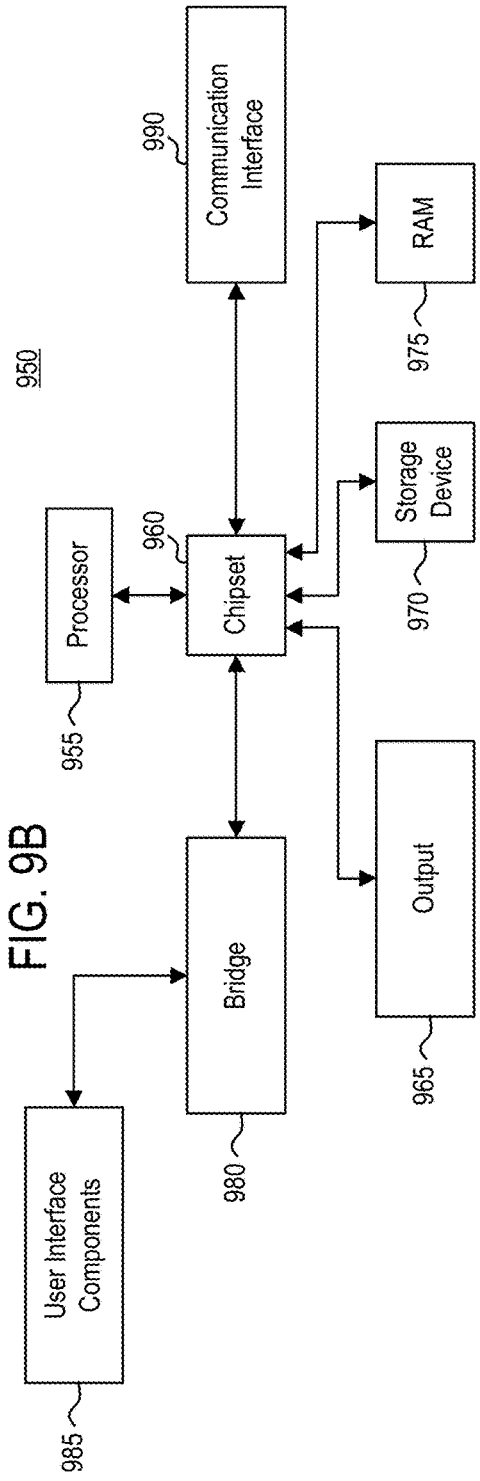
FIG. 9B illustrates a computer system having a chipset architecture, according to example embodiments To facilitate understanding, identical reference numerals have been used, where possible, to designate identical elements that are common to the figures. It is contemplated that elements disclosed in one embodiment may be beneficially utilized on other embodiments without specific recitation.

FIG. 9B illustrates a computer system 950 having a chipset architecture that may represent at least a portion of deep learning processor 118, according to example embodiments. Computer system 950 may be an example of computer hardware, software, and firmware that may be used to implement the disclosed technology. System 950 may include a processor 955, representative of any number of physically and/or logically distinct resources capable of executing software, firmware, and hardware configured to perform identified computations. Processor 955 may communicate with a chipset 960 that may control input to and output from processor 955. In this example, chipset 960 outputs information to output 965, such as a display, and may read and write information to storage device 970, which may include magnetic media, and solid-state media, for example. Chipset 960 may also read data from and write data to RAM 975. A bridge 980 for interfacing with a variety of user interface components 985 may be provided for interfacing with chipset 960. Such user interface components 985 may include a keyboard, a microphone, touch detection and processing circuitry, a pointing device, such as a mouse, and so on. In general, inputs to system 950 may come from any of a variety of sources, machine generated and/or human generated.

Chipset 960 may also interface with one or more communication interfaces 990 that may have different physical interfaces. Such communication interfaces may include interfaces for wired and wireless local area networks, for broadband wireless networks, as well as personal area networks. Some applications of the methods for generating, displaying, and using the GUI disclosed herein may include receiving ordered datasets over the physical interface or be generated by the machine itself by processor 955 analyzing data stored in storage device 970 or RAM 975. Further, the machine may receive inputs from a user through user interface components 985 and execute appropriate functions, such as browsing functions by interpreting these inputs using processor 955.

It may be appreciated that example systems 900 and 950 may have more than one processor 910 or be part of a group or cluster of computing devices networked together to provide greater processing capability.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

The invention claimed is:

1. A manufacturing system, comprising:
   one or more process stations configured to execute a manufacturing process, wherein the manufacturing process comprises an initial set of processing parameters;
   a station control system configured to control the one or more process stations; and
   a controller in communication with the one or more process stations and the station control system, the controller configured to perform operations comprising:

receiving desired process values associated with the one or more process stations;

receiving desired target values for one or more key performance indicators of the manufacturing process, wherein each key performance indicator of the one or more key performance indicators is a computed value based on one or more intermediate or final output values generated during the manufacturing process;

generating, by a deep learning processor, a proposed state change of at least one processing parameter of the initial set of processing parameters;

simulating, by the deep learning processor, the manufacturing process to generate expected process values and expected target values for the one or more key performance indicators based on the proposed state change;

determining, by the deep learning processor, that the proposed state change is acceptable by:
  determining that the expected process values and the expected target values for the one or more key performance indicators are within an acceptable tolerance,
  determining that the proposed state change is within equipment limits of the one or more process stations,
  determining that the proposed state change is within a user specification, the user specification narrower than the equipment limits, and
  determining that the expected process values and the expected target values are in statistical process control; and responsive to determining that the proposed state change is acceptable:
  causing a change to the initial set of processing parameters based on the proposed state change, and
  causing the one or more process stations to execute the manufacturing process in accordance the change to the initial set of processing parameters.

2. The manufacturing system of claim 1, wherein determining that the proposed state change is within the equipment limits of the one or more process stations further comprises:
  initially determining that the proposed state change is not within initial equipment limits; and
  determining that the initial equipment limits are mutable; and
  upon determining that the initial equipment limits are mutable, changing the initial equipment limits to generate new equipment limits, wherein the proposed state change is within the new equipment limits.

3. The manufacturing system of claim 1, wherein determining that the proposed state change is within the user specification further comprises:
  initially determining that the proposed state change is not within initial user specifications;
  determining that the initial user specifications are mutable; and
  upon determining that the initial user specifications are mutable, changing the initial user specifications to generate new user specifications, wherein the proposed state change is within the new user specifications.

4. The manufacturing system of claim 1, wherein determining that the expected process values and the expected target values are in statistical process control comprises:

initially determining that the proposed state change is within initial limits of statistical process control;

determining that the initial limits of statistical process control are mutable; and upon determining that the initial limits of statistical process control are mutable, changing the initial limits of statistical process control to generate new limits of statistical process control, wherein the proposed state change is within the new limits of statistical process control.

5. A computer-implemented method comprising:
receiving, by a computing system, desired process values associated with one or more process stations, the one or more process stations configured to execute a manufacturing process, wherein the manufacturing process comprises an initial set of processing parameters;

receiving by the computing system, desired target values for one or more key performance indicators of the manufacturing process, wherein each key performance indicator of the one or more key performance indicators is a computed value based on one or more intermediate or final output values generated during the manufacturing process;

generating, by a deep learning processor, a proposed state change of at least one processing parameter of the initial set of processing parameters;

simulating, by the deep learning processor of the computing system, the manufacturing process to generate expected process values and expected target values for the one or more key performance indicators based on the proposed state change;

determining, by the deep learning processor of the computing system, that the proposed state change is acceptable by:
  determining that the expected process values and the expected target values for the one or more key performance indicators are within an acceptable tolerance,
  determining that the proposed state change is within equipment limits of the one or more process stations,
  determining that the proposed state change is within a user specification, the user specification narrower than the equipment limits, and
  determining that the expected process values and the expected target values are in statistical process control; and responsive to determining that the proposed state change is acceptable:
  causing, by the computing system, a change to the initial set of processing parameters based on the proposed state change, and
  causing, by the computing system, the one or more process stations to execute the manufacturing process in accordance the change to the initial set of processing parameters.

6. The computer-implemented method of claim 5, wherein determining that the proposed state change is within the equipment limits of the one or more process stations further comprises:
  initially determining that the proposed state change is not within initial equipment limits; and
  determining that the initial equipment limits are mutable; and
  upon determining that the initial equipment limits are mutable, changing the initial equipment limits to generate new equipment limits, wherein the proposed state change is within the new equipment limits.

7. The computer-implemented method of claim 5, wherein determining that the proposed state change is within the user specification further comprises:
- initially determining that the proposed state change is not within initial user specifications;
- determining that the initial user specifications are mutable; and
- upon determining that the initial user specifications are mutable, changing the initial user specifications to generate new user specifications, wherein the proposed state change is within the new user specifications.

* * * * *